United States Patent
Subrahmanian et al.

(10) Patent No.: US 11,386,708 B2
(45) Date of Patent: Jul. 12, 2022

(54) COGNITION ASSISTANCE

(71) Applicant: ACCENTURE GLOBAL SOLUTIONS LIMITED, Dublin (IE)

(72) Inventors: Biju Subrahmanian, Bangalore (IN); Bolaka Mukherjee, Howrah (IN); Vipin Anilkumar Bhasin, Pune (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 43 days.

(21) Appl. No.: 17/076,520

(22) Filed: Oct. 21, 2020

(65) Prior Publication Data

US 2022/0121840 A1    Apr. 21, 2022

(51) Int. Cl.
*G06V 40/20* (2022.01)
*G06V 40/16* (2022.01)
*G06F 40/169* (2020.01)
*G06V 20/20* (2022.01)
*G06V 20/00* (2022.01)
*G06V 20/40* (2022.01)

(52) U.S. Cl.
CPC .......... *G06V 40/173* (2022.01); *G06F 40/169* (2020.01); *G06V 20/20* (2022.01); *G06V 20/36* (2022.01); *G06V 20/46* (2022.01); *G06V 40/20* (2022.01)

(58) Field of Classification Search
CPC .... G06V 40/173; G06V 40/169; G06V 20/20; G06V 20/46; G06V 20/36; G06V 40/20
See application file for complete search history.

(56) References Cited

U.S. PATENT DOCUMENTS

| | | | | |
|---|---|---|---|---|
| 2004/0264780 | A1* | 12/2004 | Zhang | G06F 16/58 382/224 |
| 2010/0086215 | A1* | 4/2010 | Bartlett | G06V 40/172 382/224 |
| 2010/0312734 | A1* | 12/2010 | Widrow | G06N 3/02 706/25 |
| 2015/0269421 | A1* | 9/2015 | Liu | G06K 9/629 382/118 |
| 2017/0160813 | A1* | 6/2017 | Divakaran | G06N 20/00 |
| 2019/0166101 | A1* | 5/2019 | Ramos | H04L 9/0827 |

* cited by examiner

*Primary Examiner* — Syed Haider
(74) *Attorney, Agent, or Firm* — Mannava & Kang, P.C.

(57) ABSTRACT

A system for providing cognition assistance including a contextual memory trainer, which receives preprocessed data including facial data, scene data, and activity data related to a video in association with temporal data and geographical location data of the camera that captured the video, where the scene data, the activity data, the geographical location data, and the temporal data collectively define spatiotemporal data. The trainer identifies an unknown aspect in the preprocessed data based on historical data and determines a predefined priority factor therefor. The priority factor includes one of a frequency of occurrence within a set period and relative proximity of the unknown aspect to the camera, a known face, place, or scene. The unknown aspect is prioritized for annotation based on a value of the priority factor exceeding a predefined threshold value, based on which facial data is associated with the spatiotemporal data to provide contextual annotated data.

20 Claims, 13 Drawing Sheets

1200

Receiving preprocessed data by a processor in communication with an input data device coupled to a camera, the input data device operating to receive a video image frame captured by the camera, wherein the video image frame is related to an event, and preprocess the video image frame to extract facial data, scene data, and activity data therefrom in association with temporal data related thereto and geographical location data of the camera to provide the preprocessed data, wherein the scene data, the activity data, the geographical location data, and the temporal data collectively define spatiotemporal data
1202

Identifying an unknown aspect related to the preprocessed data based on a comparison with predetermined historical data, the unknown aspect being one of a face related to the facial data, a place related to the geographical location data, and a scene related to the scene data, wherein the unknown aspect is unassociated with predefined tags in the historical data
1204

Determining a predefined priority factor for the identified unknown aspect, wherein the predefined priority factor includes at least one of a frequency of occurrence of the identified unknown aspect within a predefined period, a proximity of the identified unknown aspect from the camera, a proximity of the identified unknown aspect to a known face related to the facial data, wherein the known face is tagged in the historical data, and a proximity of the identified unknown aspect to a known place tagged in the historical data
1206

FIG. 12A

COGNITION ASSISTANCE

BACKGROUND

Human cognitive ability is generally fallible to cause everyday forgetfulness and can even suffer a steep decline due to a brain injury or disease. Such a decline is quite severe in people diagnosed with clinical memory disorders such as Parkinson's and Alzheimer's. For example, a patient who has dementia may often fail to recognize or recall friends and family members, misplace items or confuse routes to familiar places like home, lose track of time, and experience difficulty completing routine tasks such as attending appointments. Because medical therapies and treatments insofar have yielded limited success in repairing such impaired or reduced memory function, the use of external aid devices for memory recollection is a common practice.

Existing memory aid devices typically record a geographical location and physiological data (e.g., heart rate, blood pressure, etc.) of the patient as well as motion, lighting, and temperature conditions proximate thereto. The recorded data is generally played back to the patient to recreate an environment of a prior event to assist in prompting a recollection of a past experience (or retrospective memory). Such playback of recreated physiological and environmental factors may trigger recalling an unpleasant moment in the memory or a bodily response that could adversely impact the well-being and health of the patient. Another typical approach includes recognizing and recording facial attributes of people interacting with the patient and annotating those attributes with corresponding names. Such annotated facial data is thereafter reproduced or used for prompting the patient to assist in recognizing a person during a live interaction therewith. However, sole reliance on annotated facial information remains mentally taxing for the patient to recall the person, thereby delaying a related memory recollection and emotionally frustrating the patient, such person, or a caregiver.

BRIEF DESCRIPTION OF DRAWINGS

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIGS. 12A-12B illustrate a method for cognition assistance implemented by the system of FIG. 1, according to an example embodiment of the present disclosure.

DETAILED DESCRIPTION

Figure 1:
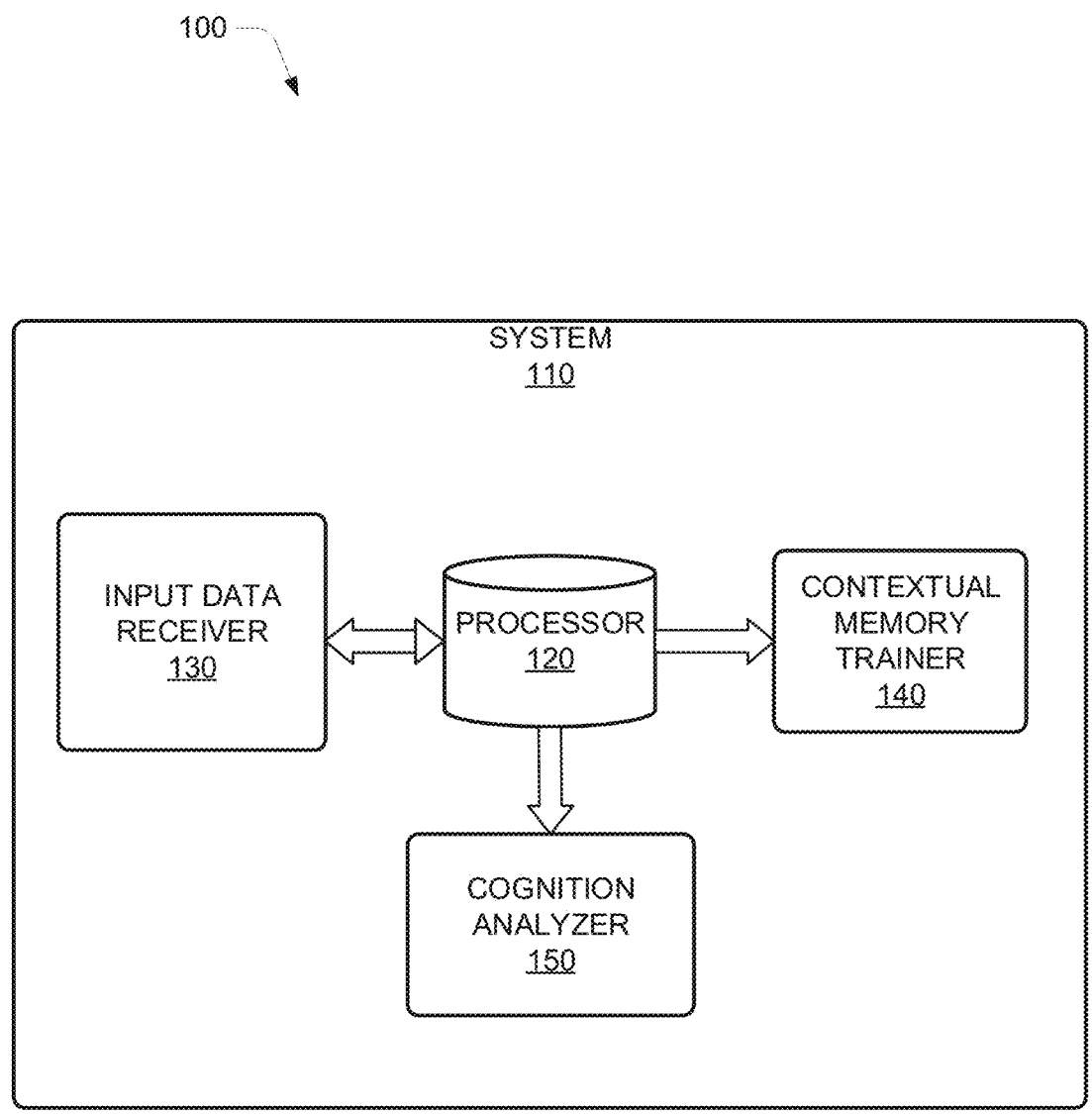
FIG. 1 illustrates a system for cognition assistance, according to an example embodiment of the present disclosure.

For simplicity and illustrative purposes, the present disclosure is described by referring mainly to examples thereof. The examples of the present disclosure described herein may be used independently or together in different combinations. In the following description, details are set forth in order to provide an understanding of the present disclosure. It will be readily apparent, however, that the present disclosure may be practiced without limitation to any of these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

Various embodiments of the present disclosure describe providing cognition assistance. In one example, the embodiments may be implemented using a system including an input data receiver, a contextual memory trainer, and a cognition analyzer. The input data receiver may be coupled to a camera and a microphone to capture a video including one or more image frames and associated audio data. The input data receiver may preprocess each image frame to extract facial data, scene data, activity data, and audio data in association with temporal data related thereto and geographical location data of the camera to provide preprocessed data. The scene data, the activity data, the temporal data, and the geographical location data may collectively define spatiotemporal data. The contextual memory trainer may receive the preprocessed data during a training mode to identify an unknown aspect of the preprocessed data based on a comparison with historical data associated with various predefined tags. The contextual memory trainer may then determine a predefined priority factor for the identified unknown aspect, where the priority factor may include at least one of a frequency of occurrence of the unknown aspect within a predefined period and a relative geographical proximity of the unknown aspect to the camera, a known face, or a known place. The unknown aspect is prioritized for annotation based on a value of the determined priority factor exceeding a predefined threshold value. The prioritized aspect is annotated based on which the facial data is associated with the spatiotemporal data to provide contextual annotated data. Further, the contextual memory trainer trains multiple predefined temporal models based on the contextual annotated data. The trained models and the contextual annotated data are used by the cognition analyzer to provide a contextual output for live data if facial data and spatiotemporal data therein are assessed to be related to each other. The contextual output indicates a mental memory of a user using the system.

The present disclosure provides for a system to provide cognition assistance to users. The present disclosure may assist to contextually recognize faces, scenes, places, activities, and events or event types. The present disclosure may further assist to prioritize annotation of an unknown aspect (e.g., face, place, scene etc.) that may be contextually relevant to a user, thereby reducing the system training time, enhancing simplicity of use, and improving relevancy of a provided output indicating a retrospective or a prospective mental memory of a user. The present disclosure may also annotate the unknown aspect using a contextual tag, which may be determined based on facial data, spatiotemporal data, and/or audio data contextually related to each other or provided by a user. The present disclosure may contextually associate the facial data with the spatiotemporal data to derive a contextual annotated data including the annotated aspect. The contextual annotated data may assist to contextually comprehend a current visual event and accordingly provide a contextual output based on the contextual annotated data. The present disclosure may also translate such contextual output at least in-part into a predefined human-readable format for easy understanding by the user.

Embodiments are described in the context of cognition assistance for healthcare. However, it will be appreciated that the embodiments and concepts described herein may be applied in other scenarios involving a contextual relationship between facial data and spatiotemporal data associated with past, current, and future events. Examples of these scenarios may include, but are not limited to, user-generated content management, search engine optimization, fake news detection, customer relationship management, traffic management, retail and sales management, advertising, access and security management.

FIG. 1 illustrates a system for cognition assistance, according to an example embodiment of the present disclosure. The system 110 may be implemented by way of a single device or a combination of multiple devices that are operatively connected or networked to each other. The system 110 may be implemented in hardware or a suitable combination of hardware and software. As illustrated, the system 110 may be a hardware device including a processor 120 executing machine readable program instructions to, at least one of, communicate synchronously or asynchronously with one or more software applications, databases, storage devices, or appliances operating via same or different communication protocols, formats, database schemas, platforms or any combination thereof; capture and/or receive a video including a sequence of one or more image frames and associated audio data; preprocess each of the image frames to (i) extract facial data, scene data, and activity data therefrom, (ii) temporal data related to each of the image frames, and geographical location data related to a camera used to capture the video, where the scene data, the activity data, the geographical location data, and the temporal data may collectively define spatiotemporal data; identify an unknown aspect including a face, a place, or a scene related to the preprocessed data; determine a predefined priority factor for the identified unknown aspect, where the predefined priority factor includes a frequency of occurrence within a predefined period and/or a relative proximity of the unknown aspect to at least one of the camera, a known face, or a known place; prioritize annotation of the identified unknown aspect based on the determined priority factor being above a predefined threshold; annotate the prioritized unknown aspect using a predetermined contextual tag; associate the facial data with the spatiotemporal data based on the annotated aspect to provide contextual annotated data; train one or more predefined temporal models based on the contextual annotated data; and provide an output corresponding to a mental memory of a user based on the contextual annotated data and the trained models.

The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 120 may include, for example, microprocessors, microcomputers, microcontrollers, digital signal processors, central processing units, state machines, logic circuits, and/or any devices that manipulate data or signals based on operational instructions. Among other capabilities, the processor 120 may fetch and execute computer-readable instructions in a computer memory operationally coupled with the system 110 for performing tasks such as signal coding, data processing input/output processing, power control, and/or any other functions.

In one example, the processor 120 may be coupled to an input data receiver 130, a contextual memory trainer 140, and a cognition analyzer 150. The input data receiver 130 may correspond to a component operating alone or in combination with other components/devices for capturing a video including a sequence of one or more image frames related to an event and recording audio data associated with the video. The input data receiver 130 may operate to receive the one or more image frames and associated audio data, and preprocess the received image frames to extract facial data, scene data, and activity data therefrom in association with temporal data related thereto, and geographical location data of the input data receiver or a component coupled thereto. The scene data, the activity data, the geographical location data, and the temporal data may collectively define spatiotemporal data. The input data receiver 130 may also operate to process the audio data for determining and manipulating voice data therein, discussed below in greater detail.

The contextual memory trainer 140 may correspond to a component for identifying an unknown aspect such as a face, a place, and a scene associated with the preprocessed data; determining the predefined priority factor for the identified unknown aspect, where the predefined priority factor includes a frequency of occurrence within a predefined period and/or a relative proximity of the unknown aspect to at least one of the components, a known face, and a known place; prioritizing annotation of the identified unknown aspect based on the determined priority factor being above a predefined threshold; annotating the prioritized unknown aspect using a predetermined contextual tag; associating the facial data with the spatiotemporal data based on the annotated aspect to provide contextual annotated data; and training one or more predefined temporal models based on the contextual annotated data, where the trained models and the contextual annotated data may be used to provide a contextual output corresponding to a mental memory of the user.

The cognition analyzer 150 may correspond to a component for receiving the preprocessed data including the facial data, the spatiotemporal data, and the audio data; assessing the facial data for being related to the spatiotemporal data based on the contextual annotated data; providing the contextual output based on the assessment result, where the contextual output may correspond to a mental memory of the user based on the contextual annotated data and the trained models; and providing the received preprocessed data for training the contextual memory trainer 140 based on the facial data and the spatiotemporal data being unrelated to each other.

Figure 2:
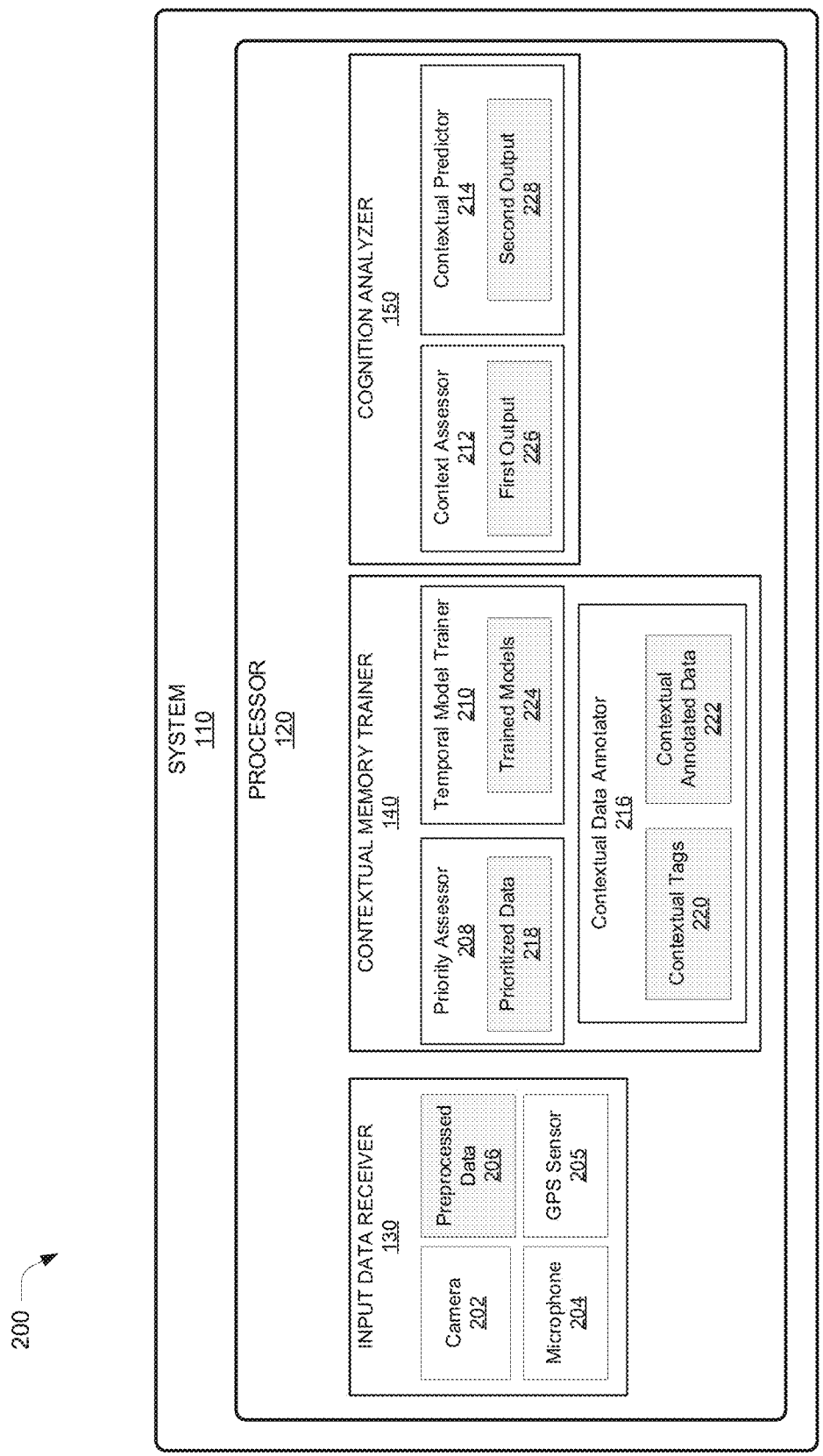
FIG. 2 illustrates components of the system of FIG. 1, according to an example embodiment of the present disclosure.
Figure 3:
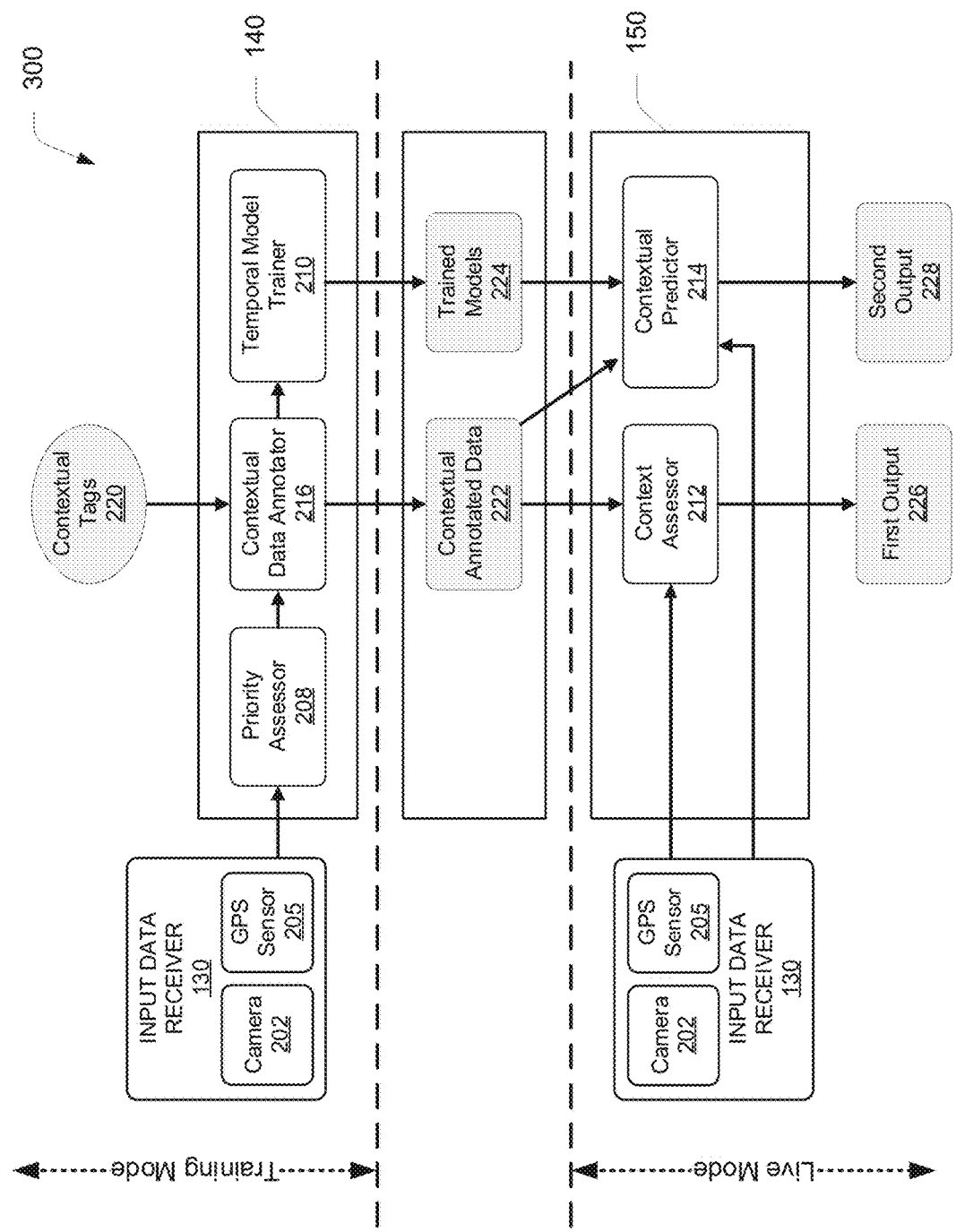
FIG. 3 illustrates a flow architecture for the system of FIG. 1, according to an example embodiment of the present disclosure.

FIG. 2 illustrates components of the system 110 of FIG. 1, according to an example embodiment of the present disclosure. The system 110 may include one or more components that may enable prioritization of unknown aspects of the preprocessed data including facial data and the spatiotemporal data for annotation based on one or more predefined priority factors related to each of the unknown aspects. The components may assist to annotate each unknown aspect using a contextual tag and accordingly associate the facial data with the spatiotemporal data for providing a contextual annotated data. For example, the system 110 may include the processor 120 coupled to one or more components such as the input data receiver 130, the contextual memory trainer 140, and the cognition analyzer 150. The system 110 may include, wholly or in part, a software application working alone or in conjunction with one or more hardware resources. Such software application may be executed by the processor 120 dedicatedly or in communication with different hardware platforms, or emulated in a virtual environment. Aspects of the system 110 may leverage known, related art, or later developed off-the-shelf software. Other embodiments may comprise the system 110 being in communication with a mobile switching center, network gateway system, Internet access node, application server, IMS core, service node, or any other type of communication systems, including any combinations thereof. In some embodiments, the system 110 may be implemented, wholly or in-part, as a movable device, wearable device, or a portable device. One having ordinary skill in the art would understand that the system 110 and/or the components described herein are examples and that similar or additional systems and/or components may be employed for performing the functionalities related thereto described in the present disclosure. The components are discussed in conjunction with an architecture 300 for the system 110 illustrated in FIG. 3. The architecture 300 provides a workflow for the components during operation. However, any other suitable architecture 300 may be contemplated based on the embodiments and concepts described in the present disclosure. It will also be appreciated that one or more of the components may operate in communication with each other irrespective of the workflow as illustrated, or otherwise, for performing any of the operations discussed herein.

In an embodiment, the input data receiver 130 may be installed, integrated, or operatively associated with a user device (not shown), which may include any computing device known in the art, related art, or developed later capable of being implemented, wholly or in-part, as a movable, a portable, or a wearable device. Examples of the user device may include, but are not limited to, a mobile computing device (e.g., a mobile phone, a tablet, a laptop, a smartwatch, etc.), a portable internet appliance, and powered or unpowered devices capable of being spatially navigated (e.g., a Segway, a wheelchair, a vacuum cleaner, a disinfection device, etc.). The input data receiver 130 either in communication with any of the network devices such as the user device or the processor 120, or dedicatedly, may have video, voice, or data communication capabilities (e.g., unified communication capabilities) by being coupled to or including, various sensors such as a camera 202, a microphone 204, a display device (not shown), a global positioning system (GPS) sensor 205, or any other types of hardware, in any combination thereof. In some embodiments, the input data receiver 130 may comprise or implement various real time protocols and non-real-time protocols known in the art, related art, or developed later to facilitate data transfer among the user device, the processor 120, or any other network devices such as a server (not shown). Further, the input data receiver 130 may convert communications, which may include instructions, queries, data, files, etc., received from the sensors and/or the user device into appropriate formats to make such communications compatible with the network devices, and vice versa, and/or readable by the user. Consequently, the input data receiver 130 may allow implementation of the network devices using different technologies or by different organizations, such as a third-party vendor, managing the server or associated services based on a proprietary technology.

The input data receiver 130 may receive input data from the sensors via any suitable interface(s), data repository, and/or components, such as the user device, coupled to the system 110 over a network. Examples of the data repository may include, but are not limited to, a Structured Query Language (SQL) database, a file system, a non-SQL database, a streaming application programming interface (API), and a cloud system. The network may include any software, hardware, or computer applications capable of providing a medium to exchange signals or data in any format known in the art, related art, or developed later. The network may include, but is not limited to, a website, a social media platform, a unified communication application, and a stand-alone application. Examples of the social media platform may include, but are not limited to, Twitter™, Facebook™, Skype™, Microsoft Lync™, Cisco Webex™, and Google Hangouts™. Further, the network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), Wi-Fi, radio, television, cable, satellite, and/or any other delivery or tunneling mechanism for carrying data. The network may include multiple networks or sub-networks, each of which may include, e.g., a wired or wireless data pathway. The network may include a circuit-switched voice network, a packet-switched data network, or any other network configurable to carry electronic communications. For example, the network may include networks based on the Internet protocol (IP) or asynchronous transfer mode (ATM), and may support voice using, for example, VoIP, Voice-over-ATM, or other comparable protocols used for voice, video, and data communications.

The received input data may include a video captured by the camera 202, audio data recorded by the microphone 204, temporal data including one or more timestamps from a time sensor, and geographical location data from the GPS sensor 205. The video may include a sequence of one or more image frames, which may be temporally associated with the audio data. Each image frame may be associated with a timestamp in synchronization with that of the audio data. Further, the geographical location data may include GPS coordinates of the camera 202 or a device integrated therewith such as the input data receiver 130 or the user device.

Figure 4:
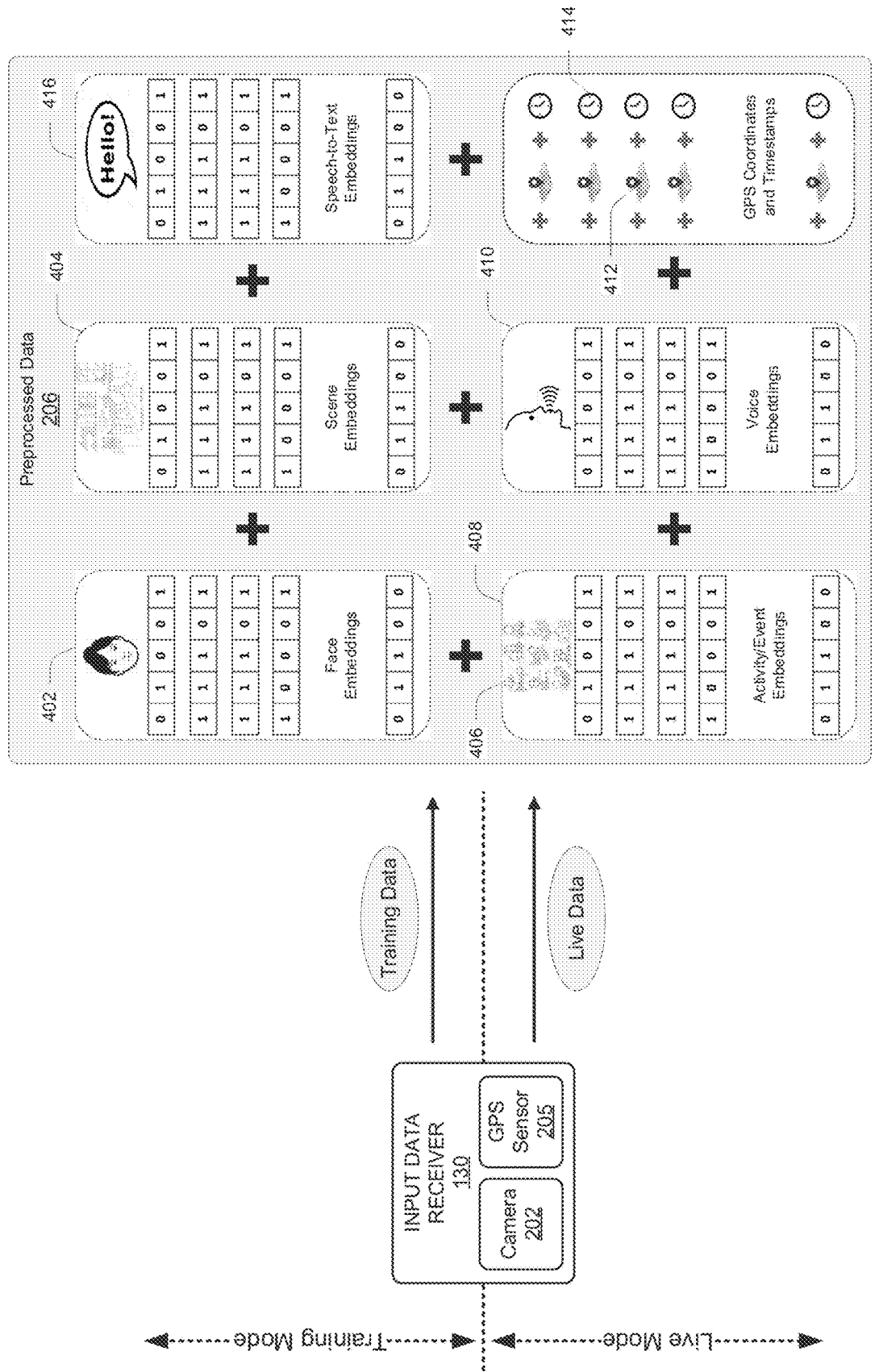
FIG. 4 illustrates an analysis of input data during a training mode and a live mode of the system of FIG. 1, according to an example embodiment of the present disclosure.

In an embodiment, the input data receiver 130 may operate to preprocess the received data based on various machine learning techniques. Such techniques may implement various models that may recognize patterns between various attributes of the input data to create one or more vectorized embeddings. For example, as illustrated in FIG. 4, the input data receiver 130 may preprocess the video to identify facial attributes in each of the image frames based on various face recognition models known in the art, related art, or developed later including multi-task cascade convolutional neural network (MTCNN) and FaceNet. The facial attributes may be collated as a collection of vectorized facial embeddings, e.g., indicated as 01001, 11101, 11101, 01100 in FIG. 4, each of which may refer to a face. These facial vectorized embeddings, collectively referred to as facial data 402, may be extracted from the image frames. Similarly, the input data receiver 130 may further analyze various objects or arrangements thereof within each image frame to identify scene attributes and activity attributes based on suitable object recognition models known in the art including Inception-V3.

The scene attributes may represent an indoor location or an outdoor location defined by the arrangement of various objects therein. The scene attributes may be extracted as vectorized scene embeddings, each of which may refer to a stationary object, and collectively referred to as scene data 404. On the other hand, the activity attributes may include an egocentric activity proximate to a frame of reference of the camera 202 and/or an allocentric activity performed by one or more objects or attributes in motion proximate to the facial vectorized embeddings. The "egocentric activity" and "allocentric activity" are used in the present disclosure in the context of their respective broadest definitions. The egocentric activity may refer to an activity being performed in a first-person-view, e.g., by a user of either the input data receiver 130 or a component coupled thereto such as the camera 202. The allocentric activity may refer to an activity being performed by a person associated with facial data, or a face, in a video image frame, for example, either received by the input data receiver 130 or captured by the camera 202. The activity attributes may be extracted as activity vectorized embeddings, each referring to an activity, and collectively referred to as activity data 406. In some embodiments, the input data receiver 130 may extract moving attributes (or activity embeddings) in relation with proximate stationary attributes (or scene embeddings) to define event attributes, which may be collated as event vectorized embeddings, each referring to a set of moving attributes and stationary attributes proximate thereto. The collated event vectorized embeddings may be referred to as event data 408.

Further, the input data receiver 130 may preprocess the audio data associated with the image frames. The audio data may include voice data 410 related to a human voice and non-voice data such as background noise, non-human sounds, and so on. The input data receiver 130 may identify various voice attributes from the audio data and extract to collate them as voice embeddings, each referring to a distinct voice, based on any suitable voice recognition models known in the art, related art, or developed later including thin ResNet34 and Ghost-VLAD networks. These voice embeddings may be collectively referred to as voice data 410. Additionally, the input data receiver 130 may convert the voice embeddings into textual embeddings based on any suitable speech-to-text models known in the art to provide text data 416 including speech transcripts. Subsequently, the extracted facial data 402, the scene data 404, the activity data 406, the event data 408, the voice data 410, and the text data 416, along with the temporal data 414 or timestamps related thereto and the geographical location data 412, may be collectively provided as preprocessed data 206. The scene data 404, the activity data 406, the temporal data 414 related thereto, and the geographical location data 412 may define spatiotemporal data associated with the video image frames. In some embodiments, the spatiotemporal data may additionally include the event data 408. Accordingly, the preprocessed data 206 including the facial data 402, the spatiotemporal data, the voice data 410, and the text data 416 may be sent to one of the components coupled to the processor 120 based on a selected operational mode of the system 110. Alternatively, in some embodiments, the preprocessed data 206 may be stored in the data repository.

The system 110 may operate one or more components coupled thereto based on predefined or dynamically defined modes controlled by the processor 120; however, these modes may be manipulated or selected from any of the components or network devices coupled to the processor 120. For example, a desired mode may be selected from the input data receiver 130; however, other components such as the user device and a server remotely coupled to the processor 120 may also be contemplated to select the desired mode. In one embodiment, the system 110 may operate in a training mode and a live mode. In the training mode, the processor 120 may communicate the preprocessed data 206 as training data to the contextual memory trainer 140 for processing. In some embodiments, the cognition analyzer 150 may be deactivated during the training mode. Similarly, in the live mode, the processor 120 may communicate the preprocessed data 206 as live data to the cognition analyzer 150 for processing. In some embodiments, the contextual memory trainer 140 may be deactivated during the live mode. Other embodiments may include additional modes, for example, a testing mode that may be selected or controlled from a system component such as the input data receiver 130 to operate or activate both the contextual memory trainer 140 and the cognition analyzer 150 simultaneously for processing the preprocessed data 206.

Figure 5:
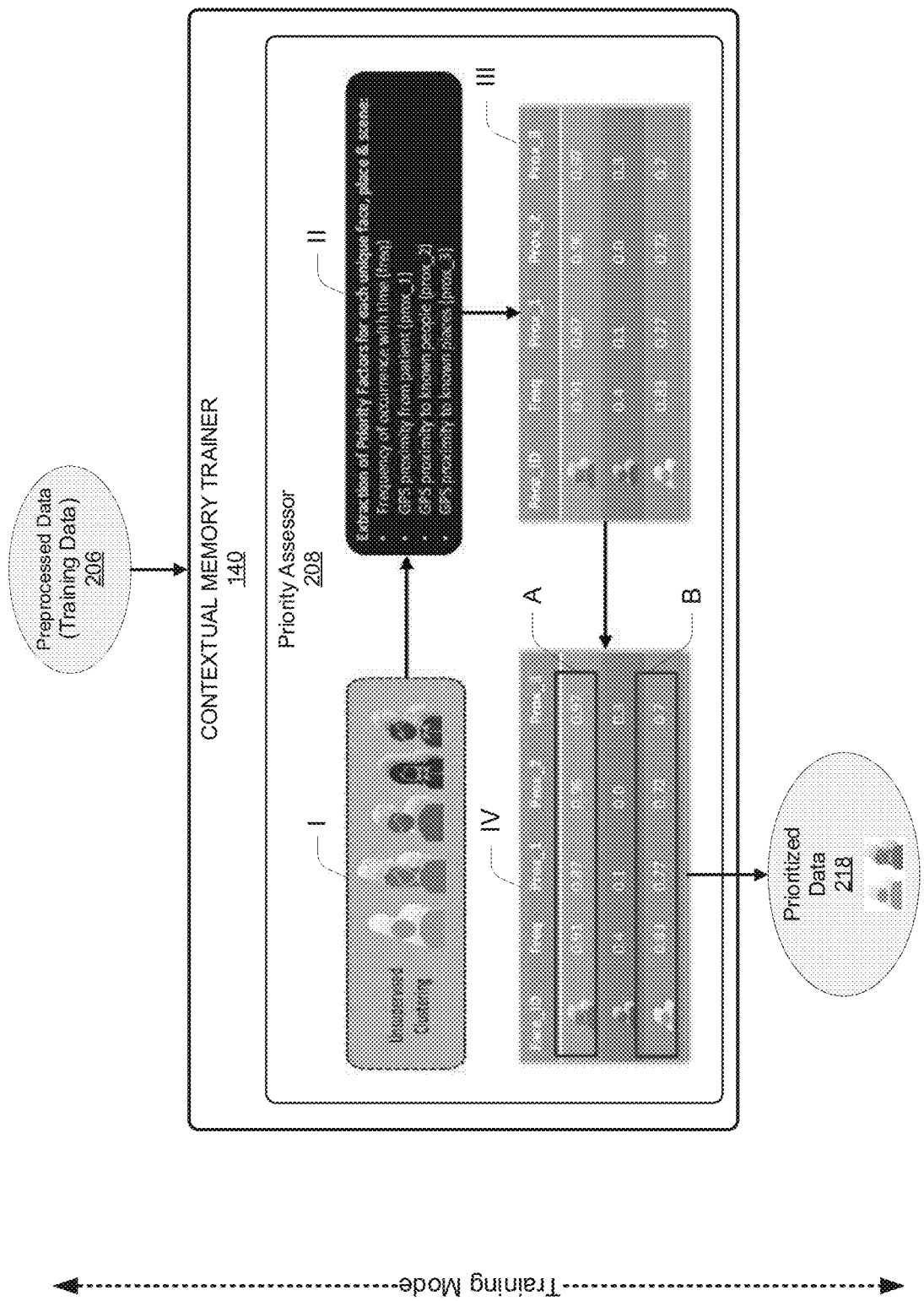
FIG. 5 illustrates a priority assessment of a unique aspect of the input data for annotation by the system of FIG. 1, according to an example embodiment of the present disclosure.

In an embodiment, as illustrated in FIG. 5, the contextual memory trainer 140 may receive the preprocessed data 206 as the training data during the training mode. The contextual memory trainer 140 may include one or more components for processing the training data. For example, the contextual memory trainer 140 may include a priority assessor 208, a contextual data annotator 216, and a temporal model trainer 210, any of which may be coupled to the processor 120 directly or via the contextual memory trainer 140.

The priority assessor 208 may operate to receive the preprocessed data 206 from the input data receiver 130 or fetch the preprocessed data 206 from the data repository via any suitable interfaces of the system 110. The received preprocessed data 206 may be unsupervised data including no tags or classifications identifying data or data types therein. The preprocessed data 206 may include at least the facial data 402 and the spatiotemporal data; however, in some embodiments, the voice data 410 and/or the text data 416 may also be received therewith. The priority assessor 208 may analyze the preprocessed data 206 to determine whether any of the underlying data aspects corresponding to faces, scenes, activities, events, and voices may be known. Such analyses may involve processing, for e.g., the facial data 402 and the spatiotemporal data to create a list of aspects related thereto. These data aspects may refer to a tag or a classification value that may qualify the related embeddings. Each of the data aspects may be compared with historical data, which may be supervised data stored in the data repository.

The historical data may include annotated facial data and annotated spatiotemporal data as well as annotated voice data and text data related thereto. Each data embedding or data type in the historical data may be previously classified and hence, associated with a predefined tag or classification. For example, the annotated facial data in the historical data may include a facial embedding corresponding to a face associated with a tag such as a name of a person (e.g., Emma, Noah, John, etc.) to whom such face may belong. Similarly, the historical data may include (i) annotated scene embeddings, each being tagged or associated with a name of an indoor location (e.g., kitchen, bathroom, bedroom, etc.) and/or an outdoor location (e.g., supermarket, doctor's clinic, kids park, etc.); (ii) annotated activity embeddings, each being tagged with a name of an activity such as cooking, walking, talking, and playing; (iii) annotated event embeddings, each being tagged with a name of an event such as birthday, farewell, funeral, and wedding; and (iv) annotated voice embeddings or text embeddings, each being tagged with a name of a person, which, in some embodiments, may be same or related to a name tagged with at least one of the annotated facial embeddings. Each of the unclassified data embeddings in the preprocessed data 206 may be identified based on a comparison thereof with corresponding tagged data types in the historical data. The priority assessor 208 may identify the data aspects related to the unclassified embeddings as unknown. These unknown aspects may not be associated with any predefined tags (e.g., name of person, place, scene, activity, event and voice) in the historical data.

In an embodiment, the priority assessor 208 may determine one or more predefined priority factors for each of the identified unknown aspects. The predefined priority factors may include (i) a frequency of occurrence of an unknown aspect within a predefined period, (ii) a proximity of the unknown aspect from the camera 202, (iii) a proximity of the unknown aspect to a known face related to the received facial data 402, where the known face may be associated with a predefined tag in the historical data, and (iv) a proximity of the unknown aspect to a known place associated with a predefined tag in the historical data. In some embodiments, the frequency of occurrence within the predefined period may have the highest priority, then the proximity to the camera 202, followed by the proximity to a known face, and the proximity to a known place having the lowest priority. Each of the priority factors may be associated with a predefined threshold value, which may correspond to a tag value or a numerical value. For example, as illustrated in FIG. 5, at step I, the priority assessor 208 may receive the preprocessed data 206 including facial data 402 corresponding to five faces, out of which only three may be unknown. At step II, the priority assessor 208 may extract the priority factors, indicated by Freq, Prox_1, Prox_2, and Prox_3, related to the unknown faces. Here, Freq may refer to a frequency of occurrence of the faces within a predefined period, Prox_1 may refer to GPS proximity of the faces to the camera 202, Prox_3 may refer to GPS proximity of the faces to known people or faces based on the historical data, and Prox_4 may refer to GPS proximity of the faces to known places based on the historical data. Based on the values of the priority factors, the priority assessor 208 may select only three of the five unknown faces at this stage. Subsequently, at step III, the values of the determined priority factors may be normalized for easy comparison. At step IV, the faces, e.g., A and B, having the normalized values of the priority factors exceeding the corresponding predefined threshold values, e.g., 0.7, may be selected.

In an embodiment, the priority assessor 208 may prioritize any unknown aspect that exceeds a predefined threshold value of any of the priority factors. In another embodiment, the priority assessor 208 may prioritize unknown aspects based upon exceeding a predefined threshold value of a priority factor being relatively higher in the priority order. In yet another embodiment, the priority assessor 208 may prioritize an unknown aspect that exceeds predefined threshold values of at least three of the priority factors. In another embodiment, the priority assessor 208 may prioritize all unknown aspects that exceed predefined threshold values of the top two priority factors in the priority order. Accordingly, the priority assessor 208 may collate the prioritized unknown aspects as the prioritized data 218 and send those to the contextual data annotator 216 for annotation. In some embodiments, the prioritized data 218 may be stored in the data repository by the priority assessor 208.

Figure 6:
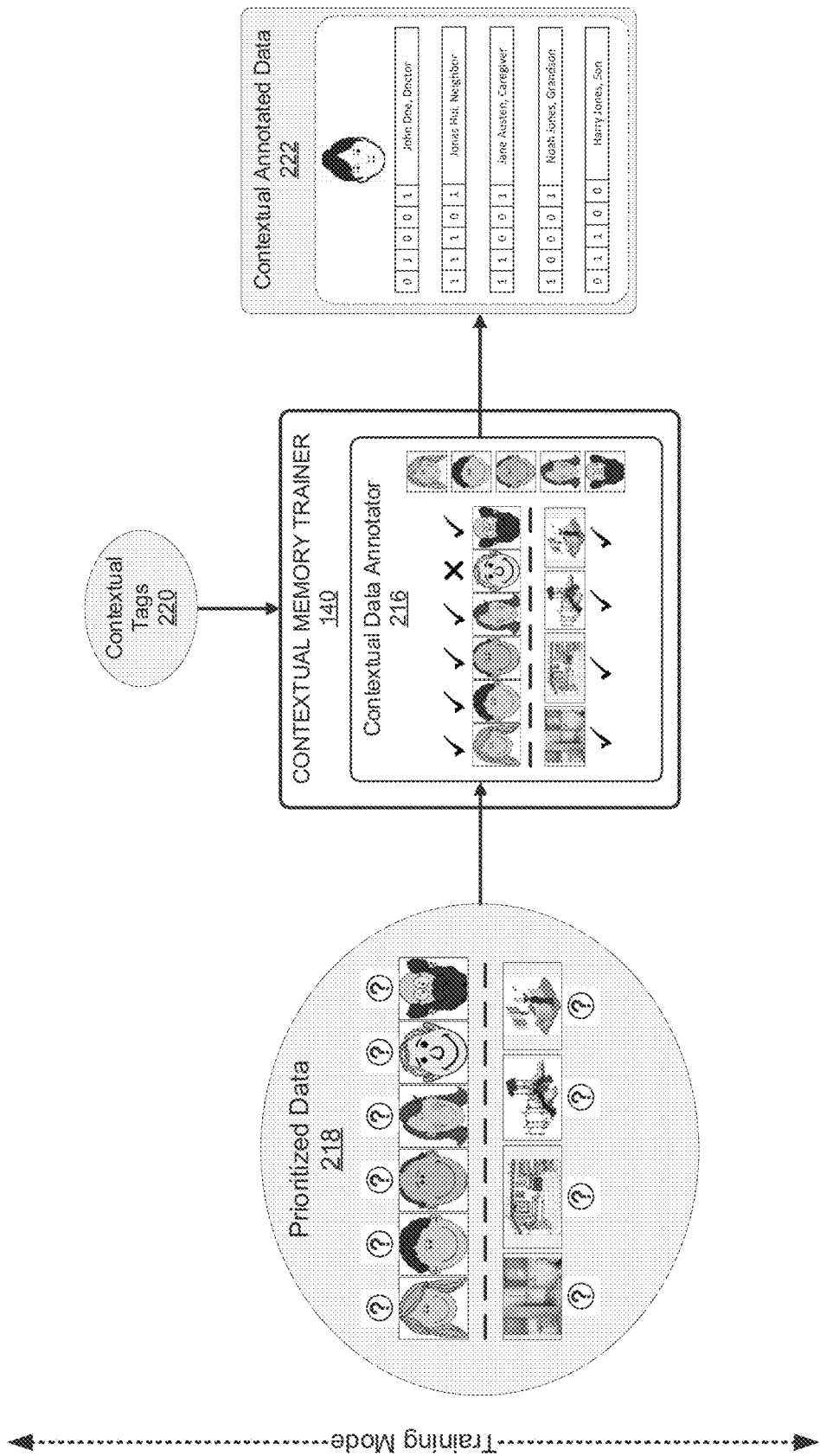
FIG. 6 illustrates a preparation of contextual annotated data by the system of FIG. 1, according to an example embodiment of the present disclosure.

As illustrated in FIG. 6, the contextual data annotator 216 may receive the prioritized data 218 from the priority assessor 208 or fetch the prioritized data 218 from the data repository via suitable interfaces coupled to the system 110. The contextual data annotator 216 may assign contextual tags, such as contextual tags 220, to the unknown aspects in the prioritized data 218. In one embodiment, the contextual data annotator 216 may determine the contextual tags 604 based on text data 416 corresponding to voice data 410 associated with the video image frames or the input data. In some other embodiments, the contextual tags 220 may be defined and provided by a user. For example, as illustrated in FIG. 6, the contextual data annotator 216 may receive the prioritized data 218 including multiple faces and scenes. The contextual data annotator 216 may determine appropriate contextual tags 220 such as names and relationships (e.g., doctor, mother, caregiver, etc.) and annotate or assign those contextual tags 220 to the corresponding prioritized faces and scenes. These unknown aspects, which may now be annotated, may be then aggregated to provide annotated data including the annotated facial data and the annotated spatiotemporal data related to the video or input data. Subsequently, for each video image frame, the contextual data annotator 216 may associate the underlying annotated facial data with the annotated spatiotemporal data to provide a contextual annotated data 222. Such related facial and spatiotemporal data may be indexed based on timestamps associated therewith in the contextual annotated data 222. Subsequently, the contextual data annotator 216 may send the contextual annotated data 222 to the temporal model trainer 210 and/or store the contextual annotated data 222 in the data repository.

Figure 7:
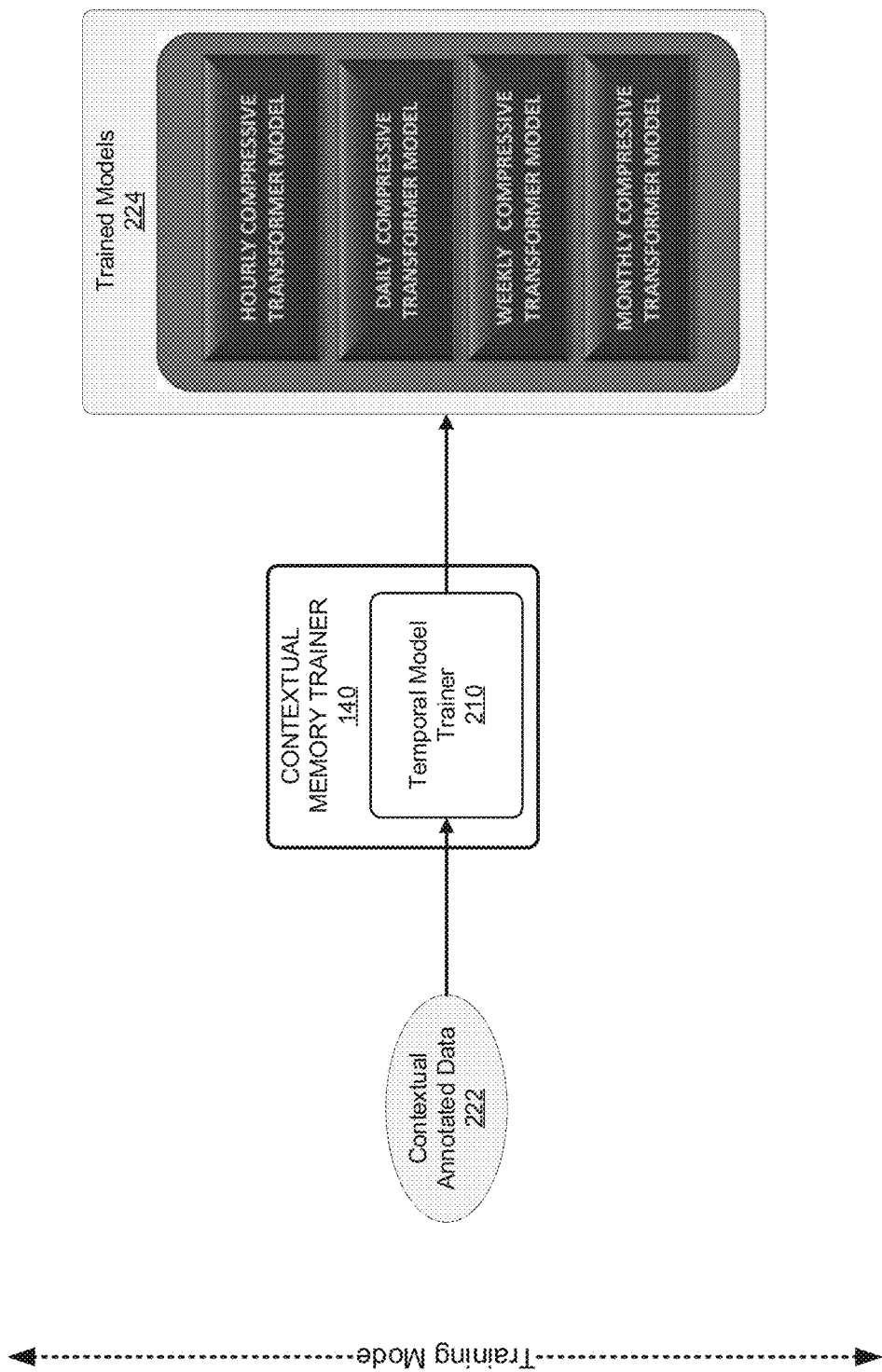
FIG. 7 illustrates training of temporal models by the system of FIG. 1, according to an example embodiment of the present disclosure.

As illustrated in FIG. 7, the temporal model trainer 210 may be configured with predefined temporal models known in the art, related art, or developed later including compressive transformer models, transformer-XL models, and long short-term-memory (LSTM) models. In one embodiment, the temporal model trainer 210 may be configured with four types of temporal models, namely, hourly temporal model, daily temporal model, weekly temporal model, and monthly temporal model. The temporal model trainer 210 may operate to train each of the temporal models based on the contextual annotated data 222 to provide a set of trained temporal models 224 (or trained models 224). The trained models 224 may be trained to extract data aspects corresponding to faces, scenes, activities, voices, texts, and geographical locations associated with an hour, a day, a week, and a month in the preprocessed data 206 based on timestamps related thereto. The trained models 224 may be stored in the data repository for use by the cognition analyzer 150.

Figure 8:
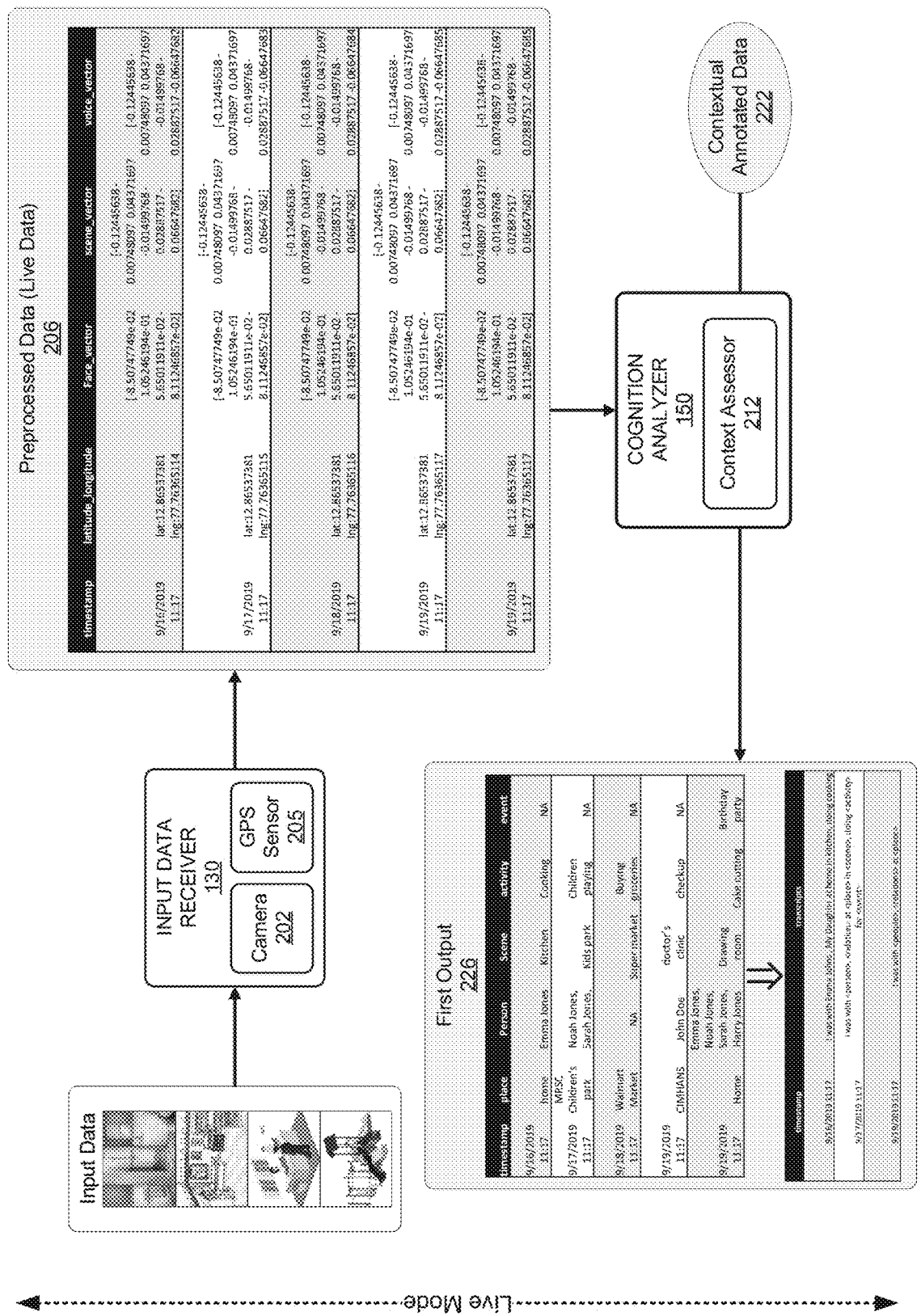
FIGS. 8-9 illustrate an assessment of a live event to provide an output indicating a retrospective mental memory by the system of FIG. 1, according to an example embodiment of the present disclosure.

As illustrated in FIG. 8, the input data receiver 130 may be coupled to the camera 202 and the microphone 204 to capture a video including a sequence of one or more image frames associated with audio data. The input data receiver 130 may preprocess the video image frames to provide the preprocessed data 206, as discussed above. In the illustrated example, the preprocessed data 206 includes the facial data 402 indicated by "face_vector" along with spatiotemporal data, voice data 410 indicated by "voice_vector." The spatiotemporal data may include the scene data 404 indicated by "scene vector," the geographical location data 412 indicated by "latitude_longitude," and the temporal data 414 indicated by "timestamp." The scene data 404 may also include the activity data 406 and the event data 408. In some embodiments, the preprocessed data 206 may also include the text data 416. The preprocessed data 206 may be stored in the data repository or passed as live data to the cognition analyzer 150 during the live mode.

Figure 9:
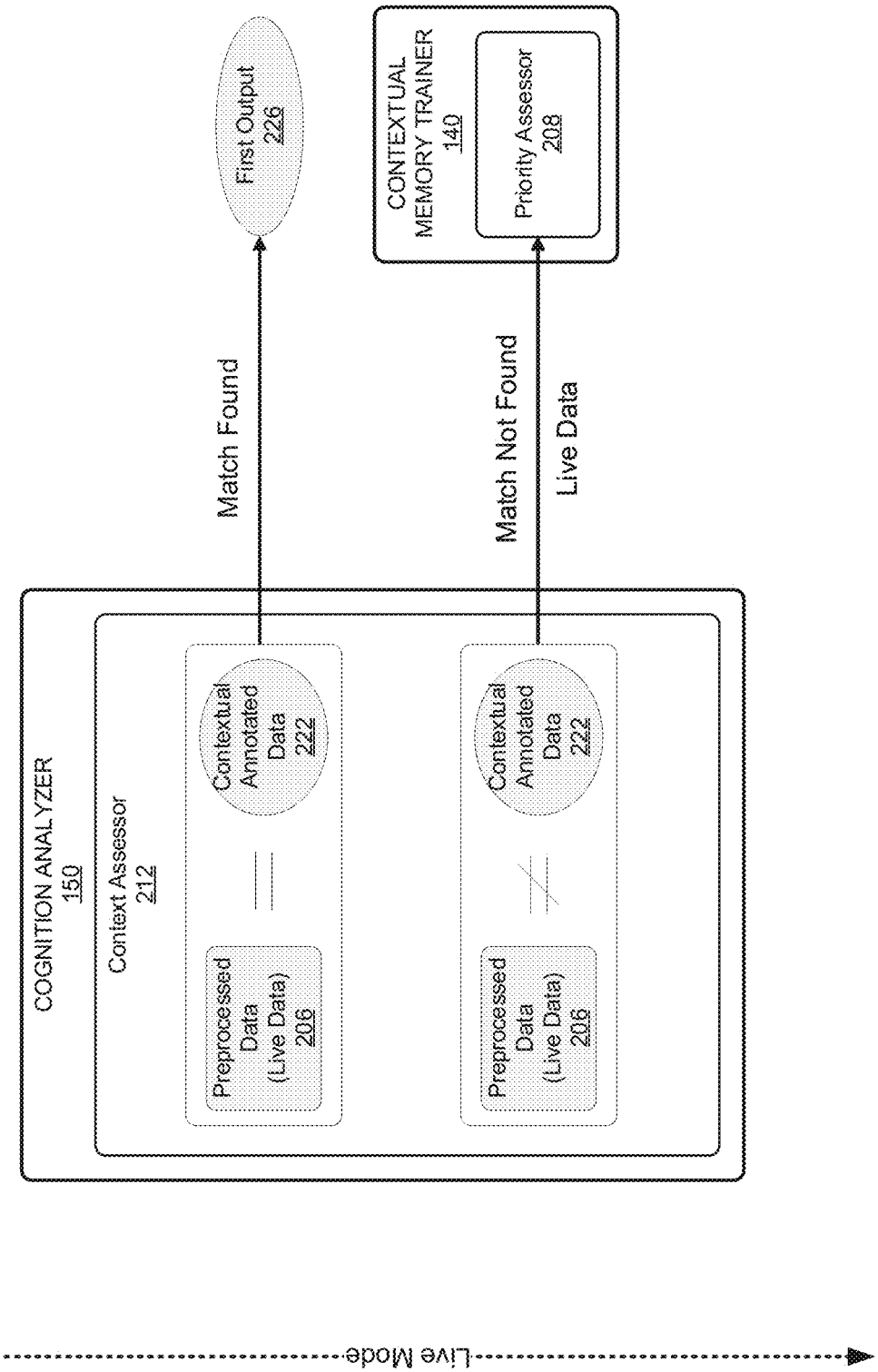

In an embodiment, as illustrated in FIG. 8, and FIG. 9, the cognition analyzer 150 may include a context assessor 212 and a contextual predictor 214, each being coupled to the processor 120, for processing the live data. As illustrated, the context assessor 212 may receive the live data or fetch the preprocessed data 206 from the data repository via any suitable interfaces coupled to the system 110. The context assessor 212 may operate to assess the facial data 402, the spatiotemporal data, and the voice data 410 in the received live data (unsupervised data) based on the contextual annotated data 222 (supervised data) stored in the data repository. The context assessor 212 may compare the live data with the contextual annotated data 222 to determine a contextual relationship between facial data 402 (and/or voice data 410) and the spatiotemporal data in the live data.

For example, the context assessor 212 may compare a facial vector embedding corresponding to a face with the contextual annotated data 222. The context assessor 212 may use the tag or classification associated with the facial vector embedding in the contextual annotated data 222 to determine the identity of the face in the live data. Based on the comparison, the context assessor 212 may determine the spatiotemporal data, which may be contextually related to the identified face in the contextual annotated data 222. Accordingly, if a face match is found, the context assessor 212 may provide a first output 226 related to the spatiotemporal data associated with the matched face. Such associated spatiotemporal data may provide a contextual information such as names of a place, scene, and activity, and a timestamp related to the matched face. Such contextual information provided as the first output 226 may indicate a retrospective (mental) memory of a past event, which may be relevant to a user. In a similar manner, the context assessor 212 may provide details of a face, such as a name, relationship, and a photograph, related to a known place, scene, or event corresponding to a tagged spatiotemporal data in the contextual annotated data 222. Hence, the first output 226 may correspond to a contextual output indicating a retrospective or past mental memory of the user. In some embodiments, the context assessor 212 may also calculate and provide a confidence score (e.g., in percentage) based on the match.

In some other embodiments, the first output 226 may be converted into a predefined human-readable format based on any suitable natural language processing (NLP) models known in the art, related art, or developed later including T5 text summarization models. The first output 226 may be displayed on a display device coupled to the system 110 and/or stored in the data repository. In some embodiments, the first output 226 may be additionally passed to the contextual predictor 214 for predicting a future event if the match may be found. However, on the other hand, if no match was found, the context assessor 212 may provide an alert signal to the user on the display device. In some embodiments, the context assessor 212 may store and/or send the received live data to the contextual memory trainer 140 based on the alert signal for prioritization, contextual annotations, and training or re-training the temporal models, as discussed above.

Figure 10:
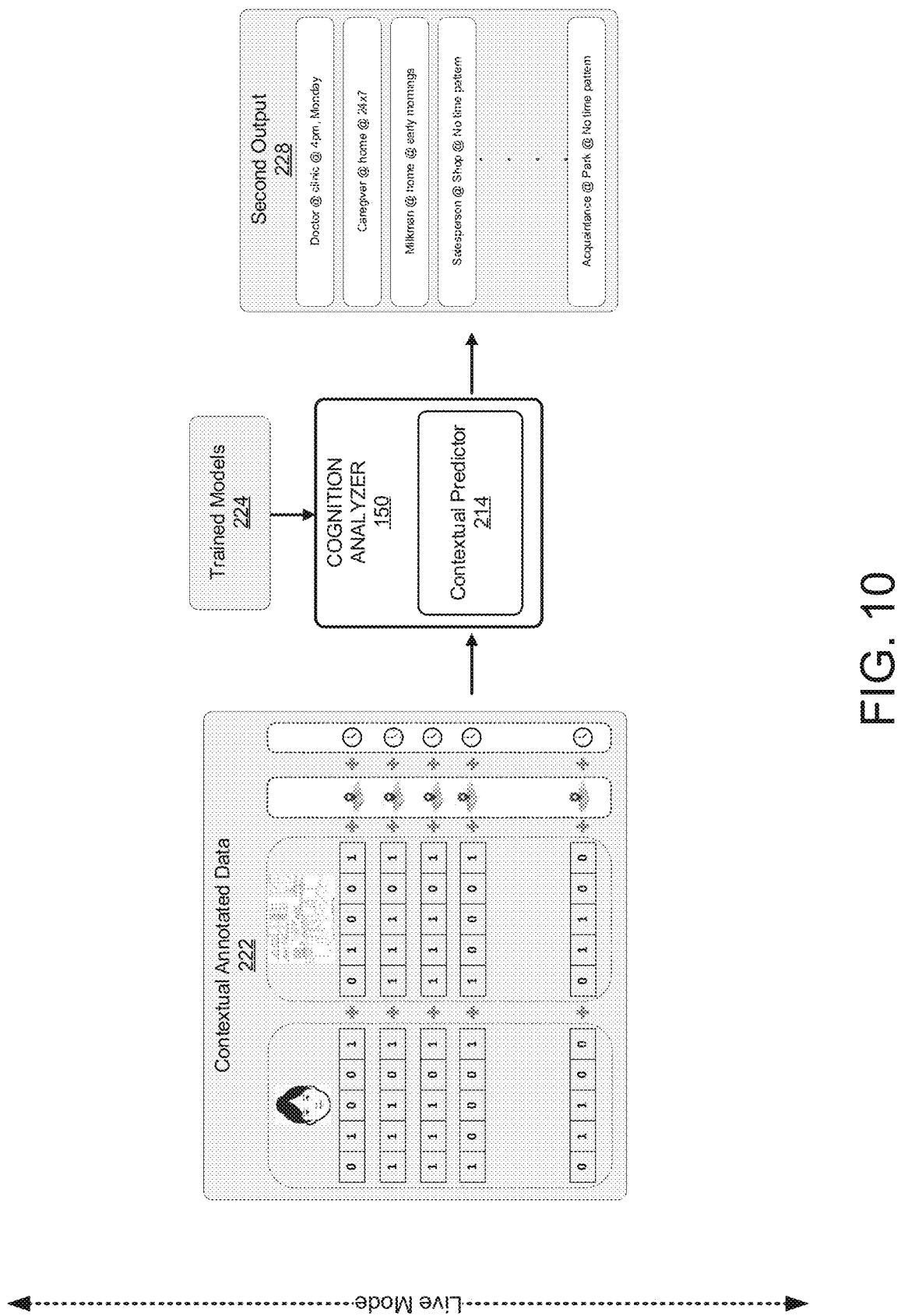
FIG. 10 illustrate providing an output indicating prospective mental memory based on the trained models by the system of FIG. 1, according to an example embodiment of the present disclosure.

As illustrated in FIG. 10, the contextual predictor 214 may operate to predict a future event or activity for providing a second output 228 based on the contextual annotated data 222 and at least one of the trained temporal models. In one example, the contextual predictor 214 may operate to provide scheduled hourly, daily, weekly, and/or monthly reminders as the second output 228 about a future event or activity to a user based on the contextual annotated data 222. In another example, the contextual predictor 214 may operate to provide the second output 228 as a contextual response to a query regarding a past or a future event. For instance, a user may submit a query with indicating a relationship (e.g., doctor, caregiver, milkman, salesperson, etc.) with the user via the input data receiver 130 or directly to the contextual predictor 214 via any suitable interfaces coupled to the system 110. The context predictor 214 may use the provided relationship, or query text, as a contextual tag and determine a contextually associated facial data and spatiotemporal data related thereto based on a comparison with the contextual annotated data 222. Based on the determination, the contextual information in the contextual annotated data 222 related to the query may be converted into a human-readable format and provided as the second output 228, which may be displayed on the display device coupled to the system 110, e.g., at the input data receiver 130. The second output 228 may indicate a prospective mental memory of the user.

Figure 11:
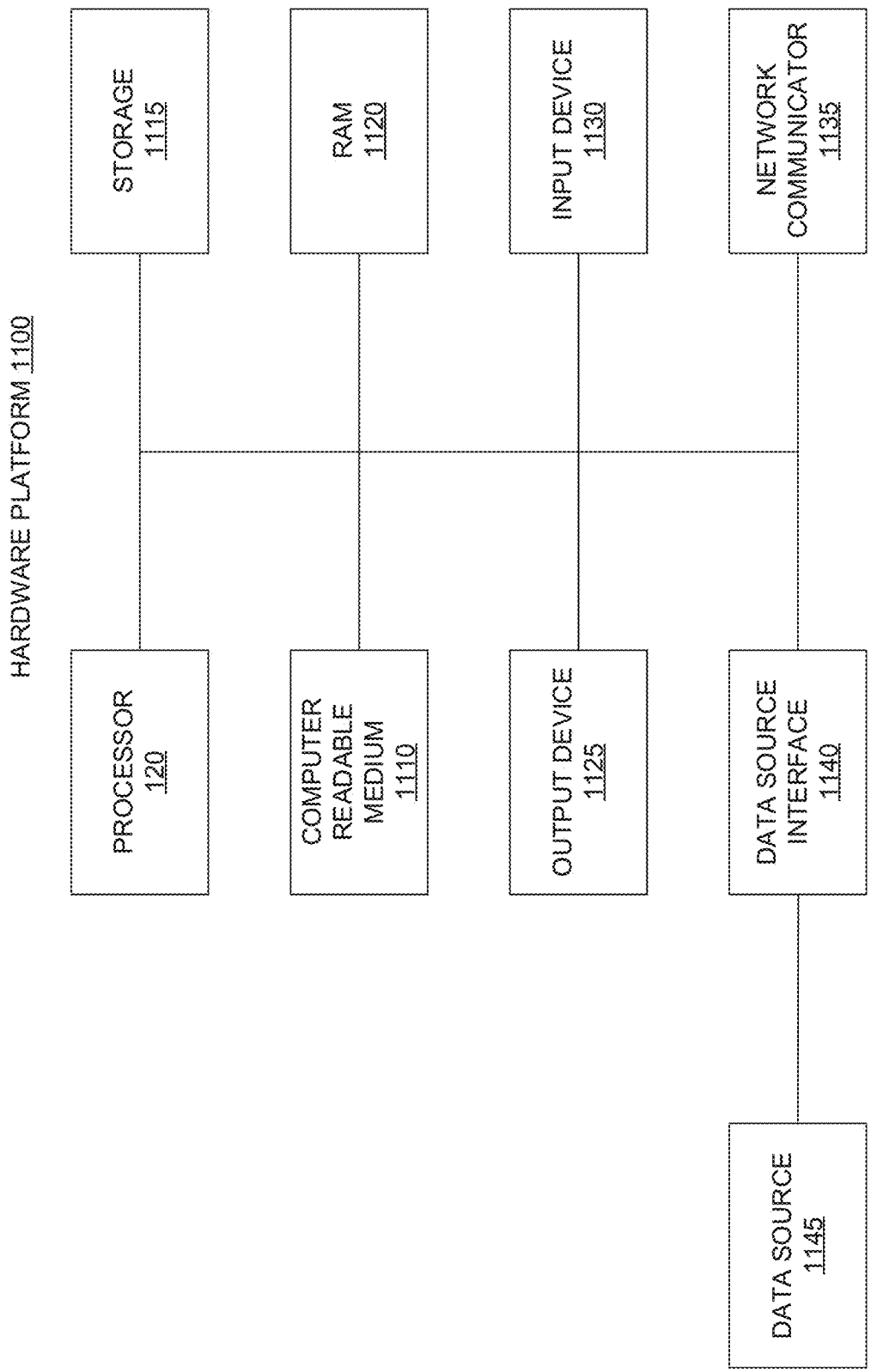
FIG. 11 illustrates a hardware platform for an implementation of the system of FIG. 1, according to an example embodiment of the present disclosure.

Further, FIG. 11 illustrates a hardware platform 1100 for the implementation of the system 110 of FIG. 1, according to an embodiment of the present disclosure. For the sake of brevity, construction and operational features of the system 110 which are explained in detail above are not explained in detail herein. Particularly, computing machines such as but not limited to internal/external server clusters, quantum computers, desktops, laptops, smartphones, tablets, and wearables which may be used to execute the system 110 or may have the structure of the hardware platform 1100. As illustrated, the hardware platform 1100 may include additional components not shown and that some of the components described may be removed and/or modified. For example, a computer system 110 with multiple GPUs may be located on external-cloud platforms including Amazon Web Services, or internal corporate cloud computing clusters, or organizational computing resources, etc.

The hardware platform 1100 may be a computer system such as the system 110 that may be used with the embodiments described herein. For example, the computer system 110 may represent a computational platform that includes components that may be in a server or another computer system 110. The computer system 110 may execute, by a processor such as the processor 120 (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 110 may include the processor 120 that executes software instructions or code stored on a non-transitory computer-readable storage medium 1110 to perform methods of the present disclosure. The software code includes, for example, instructions to gather data and documents and analyze documents. In an example, the input data receiver 130, the contextual memory trainer 140, and the cognition analyzer 150 may be software codes or components performing these steps.

The instructions on the computer-readable storage medium 1110 are read and stored the instructions in storage 1115 or in random access memory (RAM). The storage 1115 may provide a space for keeping static data where at least some instructions could be stored for later execution. The stored instructions may be further compiled to generate other representations of the instructions and dynamically stored in the RAM such as RAM 1120. The processor 120 may read instructions from the RAM 1120 and perform actions as instructed.

The computer system 110 may further include an output device 1125 to provide at least some of the results of the execution as output including, but not limited to, visual information to users, such as external agents. The output device 1125 may include a display on computing devices and virtual reality glasses. For example, the display may be a mobile phone screen or a laptop screen. GUIs and/or text may be presented as an output on the display screen. The computer system 110 may further include an input device 1130 to provide a user or another device with mechanisms for entering data and/or otherwise interact with the computer system 110. The input device 1130 may include, for example, a keyboard, a keypad, a mouse, or a touchscreen. Each of the output device 1125 and input device 1130 may be joined by one or more additional peripherals. For example, the output device 1125 may be used to display results of the input data receiver 130, the contextual memory trainer 140, and/or the cognition analyzer 150.

A network communicator 1135 may be provided to connect the computer system 110 to a network and in turn to other devices connected to the network including other clients, servers, data stores, and interfaces, for instance. A network communicator may include, for example, a network adapter such as a LAN adapter or a wireless adapter. The computer system 110 may include a data source interface 1140 to access any data source such as a data source 1145, which may be an information resource. As an example, a database of exceptions and rules may be provided as the data source 1145. Moreover, knowledge repositories and curated data may be other examples of the data source 1145.

Figure 12B:
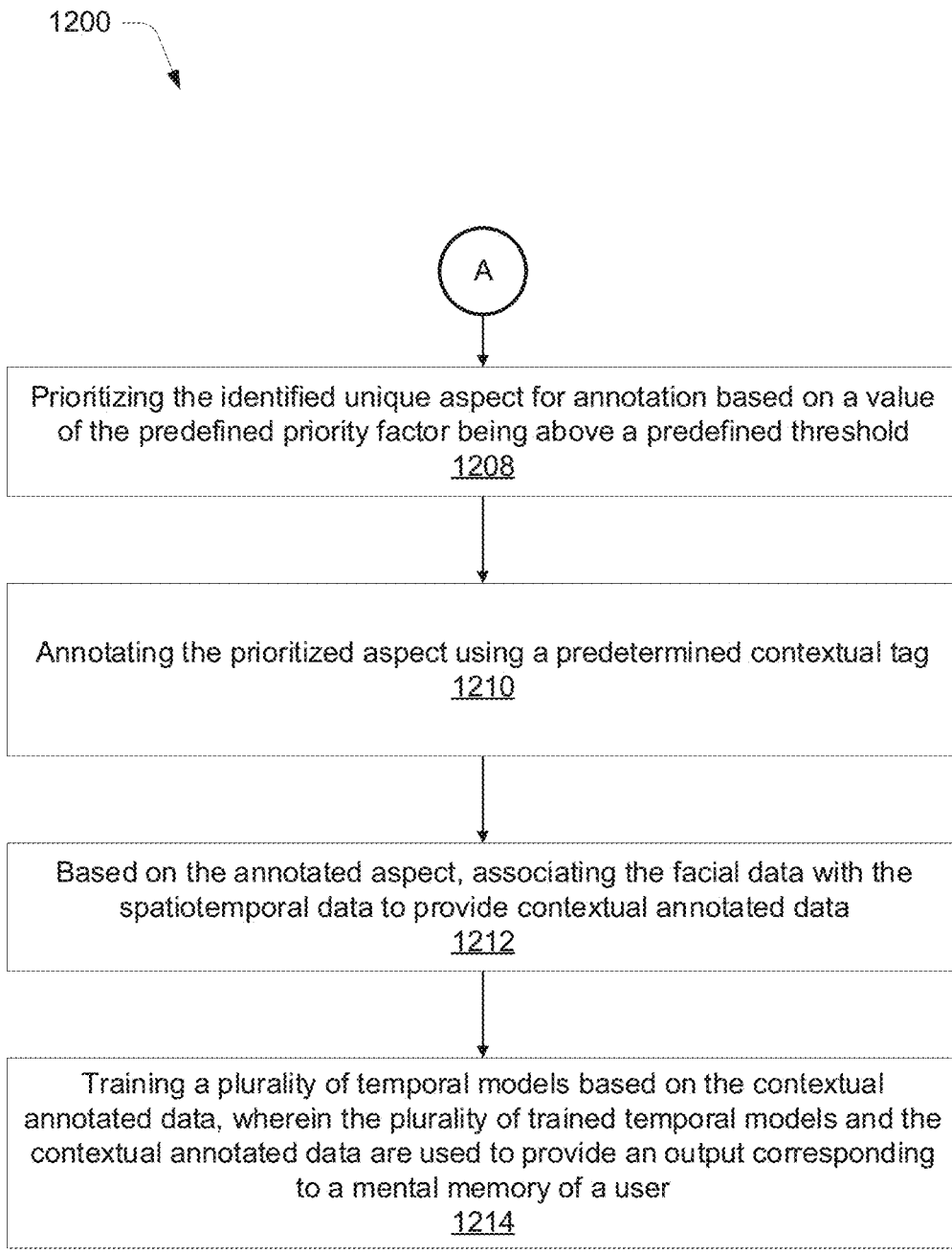

FIGS. 12A-12B illustrate a method for providing cognition assistance implemented by the system 110 of FIG. 1, according to an example embodiment of the present disclosure.

The method 1200 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 1200 is described is not intended to be construed as a limitation, and any number of the described method blocks may be combined or otherwise performed in any order to implement the method 1200, or an alternate method. Additionally, individual blocks may be deleted from the method 1200 without departing from the spirit and scope of the present disclosure described herein. Further, the method 1200 may be implemented in any suitable hardware, software, firmware, or combination thereof, that exists in the related art or that is later developed.

The method 1200 describes, without limitation, an implementation of the system 110. A person of skill in the art will understand that the method 1200 may be modified appropriately for implementation in various manners without departing from the scope and spirit of the disclosure. The method 1200 may be implemented, in at least some embodiments, by the contextual memory trainer 140 of the system 110. For example, the contextual memory trainer 140 may use the processor(s) to execute computer instructions to perform operations for providing cognition assistance.

At step 1202, preprocessed data may be received. In one embodiment, the contextual memory trainer 140, coupled to the processor 120, may receive preprocessed data 206 from the input data receiver 130 operating to receive a video image frame captured by the camera 202, where the video image frame may be related to an event. The input data receiver 130 may preprocess the video image frame to extract facial data 402, scene data 404, and activity data 406 therefrom in association with at least timestamp providing temporal data 414 related thereto and GPS coordinates providing geographical location data 412 of the camera 202 to provide the preprocessed data 206. The extracted scene data 404, the activity data 406, the geographical location data 412, and the temporal data 414 may collectively define spatiotemporal data. The scene data 404 may relate to an indoor location or an outdoor location. The activity data 406 may include one of an egocentric activity performed by a user of the input data receiver 130 and an activity performed by a person associated with the facial data 402 in the video image frame. Further, the video image frame may be associated with audio data including voice data 410 and non-voice data, such that the input data receiver 130 may determine the voice data 410 from the audio data based on predefined voice recognition models, annotate the determined voice data 410 based on the predefined tags associated with historical data stored in the data repository, recognize the name of a person related to the determined voice data 410 based on a corresponding tag associated with the historical data, and convert the voice data 410 into text based on predefined speech-to-text models. Accordingly, the preprocessed data 206 may also include the audio data as well as the text data 416 related thereto.

At step 1204, an unknown aspect related to the preprocessed data 206 may be identified. The contextual memory trainer 140 may identify the unknown aspect related to the preprocessed data 206 based on a comparison with the historical data associated with predefined tags. The unknown aspect may be one of a face related to the facial data 402, a place related to the geographical location data 412, and a scene related to the scene data 404 in the preprocessed data 206. In some embodiments, the unknown aspect may be name of an activity related to the activity data 406 and/or an event type related to the event data 408. The identified unknown aspect may be unassociated with any of the predefined tags associated with the historical data.

At step 1206, a predefined priority factor may be determined for the identified unknown. The contextual memory trainer 140 may determine at least one of the predefined priority factors including a frequency of occurrence of the identified unknown aspect within a predefined period, a geographical proximity of the identified unknown aspect from the camera 202, a geographical proximity of the identified unknown aspect to a known face related to the facial data 402 in the preprocessed data 206, and a geographical proximity of the identified unknown aspect to a known place identified by a tag, such as name of the place, associated with the historical data. Similarly, the known face may be associated with a face tag in the historical data, where the face tag may identify a person to whom the face may belong. The face tag may be a name of the person and/or a relationship of the person to an intended user. Further, the contextual memory trainer 140 may normalize the values of the determined priority factors.

At step 1208, the identified unknown aspect such as face, may be prioritized based on the normalized values of the determined priority factors exceeding corresponding predefined threshold values.

At step 1210, the contextual memory trainer 140 may annotate the prioritized aspect using a predetermined contextual tag, which may be provided by a user. In some embodiments, the contextual memory trainer 140 may determine the contextual tag based on the text data such as the text data 416 associated with the preprocessed data 206.

At step 1212, the contextual memory trainer 140 may associate the facial data such as the facial data 402 with the spatiotemporal data based on the annotated aspect to provide contextual annotated data 222, which may be appended to the historical data.

At step 1214, a plurality of temporal models may be trained. The contextual memory trainer 140 may train multiple predefined temporal models based on the contextual annotated data 222 to provide the trained models 224. During live operations, the cognition analyzer 150 may use these trained models 224 and the contextual annotated data 222 to provide a contextual output based on the facial data such as the facial data 402 being assessed to be related to the spatiotemporal data in the preprocessed data 206. Such assessment may be made by comparing the preprocessed data 206 received as live data with the contextual annotated data 222. Such contextual output may include names of persons, places, and/or scenes, which may indicate a mental memory of the user. The contextual output may be translated into a predefined human-readable format based on predefined natural language processing models. However, if the facial data such as the facial data 402 may be found to be unrelated to the spatiotemporal data based on the comparison with the contextual annotated data 222, the cognition analyzer 150 may provide an alert signal as the output. Accordingly, the cognition analyzer 150 may send the preprocessed data 206 to the contextual memory trainer 140 based on the alert signal. Hence, the contextual output may indicate a retrospective mental memory of the user upon being provided based on only the contextual annotated data 222 and may indicate a prospective mental memory of the user upon being provided based on a combination of the contextual annotated data 222 and at least one of the predefined trained temporal models. The output that is indicative of the retrospective mental memory of the user may include a recommendation of one or more names of persons associated with the known place or a known scene tagged in the contextual annotated data 222 and/or a recommendation of one or more names of places and related times associated with the known face tagged in the contextual annotated data 222. The output that is indicative of a prospective mental memory of the user may include a reminder of a future event or activity based on a trained model selected from the plurality of trained temporal models, where the trained model may be selected based on a set condition or a user query.

The present disclosure provides for the system 110 to provide cognition assistance to users. The present disclosure may assist to contextually recognize faces, scenes, places, activities, and events or event types. The present disclosure may further assist to prioritize annotation of an unknown aspect (e.g., face, place, scene etc.) that may be contextually relevant to a user, thereby reducing the system training time, enhancing simplicity of use, and improving relevancy of a provided output indicating a retrospective or a prospective mental memory of a user. The present disclosure may also annotate the unknown aspect using a contextual tag, which may be determined based on facial data, spatiotemporal data, and/or audio data contextually related to each other or provided by a user. The present disclosure may contextually associate the facial data with the spatiotemporal data to derive contextual annotated data such as the contextual annotated data 222 including the annotated aspect. The contextual annotated data may assist to contextually comprehend a current visual event and accordingly provide a contextual output based on the contextual annotated data. The present disclosure may also translate such contextual output at least in-part into a predefined human-readable format for easy understanding by the user.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
    a processor;
    an input data receiver coupled to the processor and a camera, wherein the input data receiver operates to:
        receive a video image frame captured by the camera, wherein the video image frame is related to an event; and
        preprocess the video image frame to extract facial data, scene data, and activity data in association with temporal data related thereto and geographical location data of the camera to provide preprocessed data, wherein the scene data, the activity data, the geographical location data, and the temporal data collectively define spatiotemporal data; and
    a contextual memory trainer coupled to the processor, wherein the contextual memory trainer performs training operations to:
        receive the preprocessed data including the facial data and the spatiotemporal data;
        identify an unknown aspect related to the preprocessed data based on a comparison with historical data, the unknown aspect being one of a face related to the facial data, a place related to the geographical location data, and a scene related to the scene data, wherein the unknown aspect is unassociated with predefined tags in the historical data;

determine a predefined priority factor for the identified unknown aspect, wherein the predefined priority factor includes:
- a frequency of occurrence of the identified unknown aspect within a predefined period,
- a geographical proximity of the identified unknown aspect from the camera,
- a geographical proximity of the identified unknown aspect to a known face related to the facial data, wherein the known face is tagged in the historical data, and
- a geographical proximity of the identified unknown aspect to a known place tagged in the historical data;

prioritize the identified unknown aspect for annotation based on a value of the predefined priority factor being above a predefined threshold;

annotate the prioritized aspect using a predetermined contextual tag;

based on the annotated aspect, associate the facial data with the spatiotemporal data to provide contextual annotated data; and train a plurality of temporal models based on the contextual annotated data, wherein the plurality of trained temporal models and the contextual annotated data are used to provide an output corresponding to a mental memory of a user.

2. The system as claimed in claim 1, further comprising a cognition analyzer coupled to the processor, wherein the cognition analyzer performs live operations to:
receive the preprocessed data including the facial data and the spatiotemporal data;
assess the facial data for being related to the spatiotemporal data based on the contextual annotated data; and
provide the output based on the assessment result, the output being names of persons, places, or scenes if the facial data and the spatiotemporal data are related to each other, else being an alert signal, wherein the preprocessed data is used for training the contextual memory trainer based on the alert signal.

3. The system as claimed in claim 1, wherein the output indicates a retrospective mental memory of the user upon being provided based on only the contextual annotated data and indicates a prospective mental memory of the user upon being provided based on a combination of the contextual annotated data and at least one of the plurality of trained temporal models.

4. The system as claimed in claim 1, wherein the output is indicative of a retrospective mental memory of the user, wherein the output includes one of a recommendation of one or more names of persons associated with the known place or a known scene tagged in the contextual annotated data and a recommendation of one or more names of places and related times associated with the known face tagged in the contextual annotated data.

5. The system as claimed in claim 1, wherein the output is indicative of a prospective mental memory of the user, wherein the output includes a reminder of a future event or activity based on a trained model selected from the plurality of trained temporal models, wherein the trained model is selected based on a set condition or a user query.

6. The system as claimed in claim 5, wherein the output is at least in-part translated into a predefined human-readable format based on predefined natural language processing models.

7. The system as claimed in claim 1, wherein the scene data relates to an indoor location data.

8. The system as claimed in claim 1, wherein the activity data includes one of an egocentric activity performed by the user and an activity performed by a person associated with the facial data.

9. The system as claimed in claim 1, wherein the video image frame is associated with audio data including voice data and non-voice data, wherein the input data receiver operates further to:
determine the voice data from the audio data. based on predefined voice recognition models;
annotate the determined voice data based on the predefined tags associated with the historical data;
recognize a person related to the determined voice data based on a corresponding tag associated with the historical data; and
convert the voice data into text data based on predefined speech-to-text models.

10. The system as claimed in claim 9, Wherein the contextual ag is user-defined or determined based on the text data.

11. A computer-implemented method comprising:
receiving preprocessed data by a processor in communication with an input data receiver coupled to a camera, the input data receiver operating to receive a video image frame captured by the camera, wherein the video image frame is related to an event, and preprocess the video image frame to extract facial data, scene data, and activity data therefrom in association with temporal data related thereto and geographical location data of the camera to provide the preprocessed data, wherein the scene data, the activity data, the geographical location data, and the temporal data collectively define spatiotemporal data; and
performing, by the processor, training operations comprising:
identifying an unknown aspect related to the preprocessed data based on a comparison with historical data, the unknown aspect being one of a face related to the facial data, a place related to the geographical location data, and a scene related to the scene data, wherein the unknown aspect is unassociated with predefined tags in the historical data;
determining a predefined priority factor for the identified unknown aspect, wherein the predefined priority factor includes:
- a frequency of occurrence of the identified unknown aspect within a predefined period,
- a geographical proximity of the identified unknown aspect from the camera,
- a geographical proximity of the identified unknown aspect to a known face related to the facial data, wherein the known face is tagged in the historical data, and
- a geographical proximity of the identified unknown aspect to a known place tagged in the historical data;
prioritizing the identified unknown aspect for annotation based on a value of the predefined priority factor being above a predefined threshold;
annotating the prioritized aspect using a predetermined contextual tag;

based on the annotated aspect, associating the facial data with the spatiotemporal data to provide contextual annotated data; and training a plurality of temporal models based on the contextual annotated data, wherein the plurality of trained temporal models and the contextual annotated data are used to provide an output corresponding to a mental memory of a user.

12. The method as claimed in claim 11, further comprising:

performing, by the processor in communication with the input data receiver, live operations comprising:

receiving the preprocessed data including the facial data and the spatiotemporal data;

assessing the facial data for being related to the spatiotemporal data based on the contextual annotated data; and providing the output based on the assessment result, the output being names of persons, places, or scenes if the facial data and the spatiotemporal data are related to each other, else being an alert signal, wherein the preprocessed data is used for the training operations based on the alert signal.

13. The method as claimed in claim 11, wherein the output indicates a retrospective mental memory of the user upon being provided based on only the contextual annotated data and indicates a prospective mental memory of the user upon being provided based on a combination of the contextual annotated data and at least one of the plurality of trained temporal models.

14. The method as claimed in claim 11, wherein the output is indicative of a retrospective mental memory of the user, wherein the output includes one of a recommendation of one or more names of persons associated with the known place or a known scene tagged in the contextual annotated data and a recommendation of one or more names of places and related times associated with the known face tagged in the contextual annotated data.

15. The method as claimed in claim 11, wherein the output is indicative of a prospective mental memory of the user, wherein the output includes a reminder of a future event or activity based on a trained model selected from the plurality of trained temporal models, wherein the trained model is selected based on a set condition or a user query.

16. The method as claimed in claim 15, wherein the output is at least in-part translated into a predefined human-readable format based on predefined natural language processing models.

17. The method as claimed in claim 11, wherein the scene data relates to an indoor location data.

18. The method as claimed in claim 11, wherein the activity data includes one of an egocentric activity performed by the user and an activity performed by a person associated with the facial data.

19. The method as claimed in claim 11, wherein the video image frame is associated with audio data including voice data and non-voice data, wherein the step of receiving further comprises performing operations in communication with the input data receiver for:

determining the voice data from the audio data based on predefined voice recognition. models;

annotating the determined voice data based on the predefined tags associated with the historical data;

recognizing a person related to the determined voice data based on a corresponding tag associated with the historical data; and converting the voice data into text data based on predefined speech-to-teat models.

20. The method as claimed in claim 19, wherein the contextual tag is user-defined or determined based on the text data.

* * * * *